United States Patent
Touset Rios et al.

(10) Patent No.: US 8,385,905 B2
(45) Date of Patent: Feb. 26, 2013

(54) SYSTEM AND METHOD FOR CELL INFORMATION BROADCASTING IN REDUCED-SIZE LOCAL ENVIRONMENTS IN A CELLULAR MOBILE COMMUNICATION SYSTEM

(75) Inventors: Miguel Angel Touset Rios, Madrid (ES); Daniel Almodovar Herraiz, Madrid (ES)

(73) Assignee: Vodafone Group PLC, Newbury, Berkshire (GB)

(*) Notice: Subject to any disclaimer, the term of this patent is extended or adjusted under 35 U.S.C. 154(b) by 406 days.

(21) Appl. No.: 12/445,879

(22) PCT Filed: Oct. 11, 2007

(86) PCT No.: PCT/ES2007/000576
§ 371 (c)(1),
(2), (4) Date: Nov. 14, 2010

(87) PCT Pub. No.: WO2008/046939
PCT Pub. Date: Apr. 24, 2008

(65) Prior Publication Data
US 2011/0045817 A1    Feb. 24, 2011

(30) Foreign Application Priority Data
Oct. 20, 2006  (ES) .................................. 200602683

(51) Int. Cl.
*H04W 4/00* (2009.01)
(52) U.S. Cl. .................. 455/422.1; 455/414.1; 455/443; 455/444
(58) Field of Classification Search .................. 455/3.04, 455/3.05, 3.06, 412.1, 414.1, 421, 422.1, 455/443, 444, 446, 447, 550.1, 436, 426.1; 725/62, 115, 118
See application file for complete search history.

(56) References Cited

U.S. PATENT DOCUMENTS

| | | | | |
|---|---|---|---|---|
| 5,426,637 A | * | 6/1995 | Derby et al. | 370/401 |
| 7,675,944 B2 | * | 3/2010 | Grilli et al. | 370/503 |
| 7,688,790 B1 | * | 3/2010 | Sayers et al. | 370/338 |
| 8,009,599 B2 | * | 8/2011 | Igarashi et al. | 370/310.2 |
| 2002/0025826 A1 | * | 2/2002 | Aaltonen et al. | 455/522 |

(Continued)

OTHER PUBLICATIONS

3GPP TS 23.041 V7.0.0 (Mar. 2006). Technical Specification. 3rd Generation Partnership Project; Technical Specification Group Terminals; Technical realization of Cell Broadcast Service (CBS) (Release 7) [online] [recuperado the Jan. 24, 2008]. Retrieved from the Internet: <URL: http://www.3gpp.org./ftp/Specs/archieve/23_series/23.041/23041-700 zip>.

(Continued)

*Primary Examiner* — Jean Gelin
(74) *Attorney, Agent, or Firm* — Workman Nydegger (57) ABSTRACT

Cell information broadcast system and method for reduced local environments, inferior to a radio cell, and applied to a cell (9) of a mobile telephone system. The system comprises for said cell (9) a base station (1), a plurality of mobile terminals (2), and at least one local cell broadcast equipment LCBE (3), which transmits local cell broadcast messages (5) to the mobile terminals (2) located within its coverage area (4) using a physical channel of the cellular system. Each LCBE (3) comprises reception means to recognize the transport configuration of the cell broadcast messages (5') in said cell (9), configuration and content means, to determine the format and content of the local cell broadcast messages (5), and transmission means to broadcast the local cell broadcast messages (5).

24 Claims, 3 Drawing Sheets

U.S. PATENT DOCUMENTS

| | | |
|---|---|---|
| 2002/0123361 A1 | 9/2002 | Bae |
| 2003/0123400 A1* | 7/2003 | Kloos et al. .................. 370/317 |
| 2005/0113117 A1* | 5/2005 | Bolin et al. ................ 455/456.6 |
| 2006/0111108 A1* | 5/2006 | Newbury et al. .............. 455/436 |
| 2008/0207170 A1* | 8/2008 | Khetawat et al. ............. 455/411 |
| 2010/0229205 A1* | 9/2010 | Hakusui ......................... 725/62 |
| 2010/0317574 A1* | 12/2010 | Kraft et al. .................... 514/5.9 |
| 2011/0130141 A1* | 6/2011 | Frost et al. .................... 455/436 |
| 2011/0149827 A1* | 6/2011 | Na et al. ....................... 370/312 |

OTHER PUBLICATIONS

3GPP TS 44.012 V7.0.0 (Sep. 2007). Technical Specification. 3rd Generation Partnership Project; Technical Specification Group GSM EDGE Radio Access Network; Short Message Service Cell Broadcast (SMSCB) (Release 7) [online] [recuperado the Jan. 24, 2008]. Retrieved from the Internet: <URL: http://www.3gpp.org./ftp/Specs/archieve/44_series/44.012/44012-700 zip>.

* cited by examiner

SYSTEM AND METHOD FOR CELL INFORMATION BROADCASTING IN REDUCED-SIZE LOCAL ENVIRONMENTS IN A CELLULAR MOBILE COMMUNICATION SYSTEM

FIELD OF THE INVENTION

The present invention relates to a system and method for locally transmitting cell broadcast messages, within any mobile phone system, to mobile terminals located in different local environments within a given radio cell. Said messages are not sent through the base station located in said cell, but through some local cell broadcast equipment inside said radio cell, normally located at different points, at enough distance from one another to avoid interferences among them. Said equipments are in charge of transmitting these messages via radio, through a channel of the telephone system, hereinafter called CBPCH channel (Cell Broadcast Physical Channel), which will be normally used for local cell broadcast in the mobile system (for example, the CBCH in GMS), each equipment having a given coverage area within the same radio cell, usually not overlapping themselves. The messages are transmitted by said equipments unto the mobile terminals located in their coverage area, as if they were the base station of the cell radio, and contain useful local information for the local environments where the local broadcast equipment is located. The mobile terminals do not distinguish whether said messages come from a base station or from the local cell broadcast equipment.

BACKGROUND OF THE INVENTION

Nowadays, mobile cellular networks standards (for example, GMS and UMTS) provide for local information broadcasting to a radio cell, hereinafter cell, through the CBS (Cell Broadcast Service). This service consists of the cell broadcast of information of interest for the users located therein (such as traffic, news, weather forecast, etc.) sending short cell broadcast messages, SMSCB, that reach all mobile terminals of the cell and can be visualized by them if they are adequately tuned or configured.

This service, as provided for by current specifications, has a granularity that is defined by the cell coverage radius; therefore, not being able to provide customized information for a smaller environment area or concrete points within said cell.

The present invention enables, through a controlled interference in the channel, sending SMSCB (for example, the cell broadcast channel CBCH in GSM), sent by a special device, to replace the information contained in said channel by another piece of information which is more relevant or specific to the environment of said device.

The existence of analogous devices that perform a similar function to the device object of the present invention is unknown. The 3GPP (Third Generation Partnership Project) standards suit the description of the CBS, Cell Broadcast Service, (TS 23.041, TS 44.012, TS 45.002, TS 25.324, TS 25.925), which is based on the broadcasting of a cell with granularity and does not contemplate devices with more local scope like the one being described herein.

It is known that in the field of mobile telephony, abbreviations and acronyms are often used. Below, a glossary of acronyms and terms used throughout the present descriptive report is presented:

BCCH: Broadcast Control Channel
BTS: Base Transceiver Station
CBCH: Cell Broadcast Channel
CBS: Cell Broadcast Service
CBPCH: Cell Broadcast Physical Channel
CTCH: Common Traffic Channel
FACH: Forward Access Channel
GSM: Global System for Mobile Communications
IP: Internet Protocol
LCBE: Local Cell Broadcast Equipment
MBTS: Module Base Transceiver Station
MCON: Module Configuration and Control
MTE: Terminal Module
S-CCPCH: Secondary Common Control Physical Channel
SDCCH: Stand-alone Dedicated Control Channel
SMSCB: Short Message Service Cell Broadcast
SIM: Subscriber Identity Module
TA: Time in Advance
UMTS: Universal Mobile Telecommunications System

DESCRIPTION OF THE INVENTION

The present invention relates to a cell information broadcast system and method for reduced local environments according to claim 1 and claim 13, respectively. The preferred embodiments of said method and system are defined in the dependent claims.

The system object of the invention applies to mobile telephone systems (comprising base stations, mobile terminals, and radio cells) and uses at least one local cell broadcast equipment, hereinafter LCBE (Local Cell Broadcast Equipment), that listens to the base station as if it were a mobile terminal, to recognise the physical transport configuration of the cell broadcast messages in the radio cell where said LCBE equipment is located. Then, it transmits the locally compounded information unto the mobile terminals, as if it were a base station, through the physical transport channel for cell broadcast CBPCH, which is used in that cell of the mobile telephone system for cell broadcast messages. The information broadcasted by the LCBE takes place in a reduced local environment, inferior to the radio cell size.

The system object of the invention comprises, for the radio cell in which said system is applied, a base station that provides service to the cell and a plurality of mobile terminals, which are the system users. In addition, it comprises for said cell at least one LCBE that transmits local cell broadcast messages to the mobile terminals located in its coverage area, using a physical channel that belongs to the cell phone system, hereinafter CBPCH (Cell Broadcast Physical Channel), normally the one authorized in the cell broadcast system (for example, channel CBCH in GSM), comprising said LCBE the following means: reception means MTE, in charge of synchronizing with the base station that provides service to the radio cells, wherein at least one LCBE is located, and capturing the information provided by said base station, recognizing the physical transport configuration of the cell broadcast messages in said cell; configuration and content means MCON, in charge of determining the format and content of the cell broadcast messages; and transmission means MBTS, in charge of transmitting the radio interface of the local cell broadcast messages, from the data provided by the MTE and MCON, previously calculating the transmission power.

The mobile terminals located in the coverage area of at least one LCBE receive and interpret the signal broadcasted by said, at least one, LCBE through the physical channel CBPCH, and extract the local cell broadcast messages.

In order to determine the format and content of the local cell broadcast messages, the MCON can receive some input data by means of an external service to at least one LCBE, by means of an access channel, or by means of an internal service to the LCBE; thus, the LCBE composes said messages in an autonomous way. In the first case, the access channel of the MCON module can be a local interface or a remote interface. In the latter case, the LCBE can have for example, a telephone system subscription card (for example the SIM card in GSM), whereby, the MCON module would receive the input data.

The mobile terminals can have an application with at least one of the following functions: to interpret the local cell broadcast messages sent by the LCBE through the physical transport channel CBPCH, in the event that the format thereof is different from the standard format for cell broadcast messages or if it is desired to interpret the content in a special way; to decode the message, in the event that the LCBE transmits it encrypted; to distinguish the multiplexing of the physical transport channel CBPCH between the base station and the LCBE, in the event that not only the base station but also the LCBE transmit cell broadcast messages in the same physical channel CBPCH.

To determine the format and the content of the local cell broadcast messages, the MCON can receive at least one of the following pieces of information: the message to be transmitted via the physical transport channel CBPCH; the desired coverage radius for the LCBE; the use mode of the physical channel CBPCH, that is, if said channel is shared with the base station, in which case the LCBE will enable a multiplexing mechanism between the base station and the LCBE, or it is not shared; and security information.

The system object of the invention can be applied both to a GSM system and a UMTS system, as any other mobile phone system. In the event that a GSM system is applied, the MTE can inform the MBTS of the transmission frequency of the local cell broadcast messages, the temporal slot and the multiframe plan in which the transmission must take place and the Time in Advance (TA) value to perform a transmission adjustment.

If a UMTS system is applied, the mobile network can periodically send cell broadcast messages, by means of the base station, to always keep the associated radio resource open and present so that it can be used by the LCBE, in a similar way to how it is used in the GSM system.

The present invention comprises, at the same time, a method for broadcasting cell information in reduced local environments, inferior to a radio cell, and applied to a cell of a mobile phone system, comprising for said cell a base station that provides service to the cell, and a plurality of mobile terminals, method users located within the cell. Said method uses for said cell at least one LCBE. The method includes the following phases:

a—The at least one LCBE synchronizes with the base station providing service to the radio cell where it is located, and captures the information provided for said base station, recognising the physical transport configuration of the cell broadcast messages in said cell;

b—The at least one LCBE determines the format and content of the local cell broadcast messages;

c—The at least one LCBE transmits the radio interface, previously calculating the power at which it has to transmit the local cell broadcast messages;

d—The mobile terminals located in the coverage area of the at least one LCBE receive and interpret the signal broadcasted by said LCBE through the physical transport channel CBPCH and extract the local cell broadcast messages.

In the same way as for the defined system, in order to determine the format and content of the local cell broadcast messages in phase b) the LCBE can receive some input data via an external service to the LCBE, by means of an access channel, or by means of an internal service to the LCBE; thus, the LCBE composes said messages in an autonomous way. In the first case, the access channel of the LCBE can be a local interface or a remote interface. In the latter case, the LCBE can receive the input data by means of a built-in telephone system subscription card.

The mobile terminals can use an internal application for at least one of the following cases:

to interpret the local cell broadcast messages sent by the LCBE through the physical transport channel CBPCH, in the event that the format thereof is different from the standard format for said messages or it is desired to interpret the content in a special way;

to decode the message, in the event that the LCBE transmits it encrypted;

to distinguish the multiplexing of the physical transport channel CBPCH, in the event that, not only the base station, but also the LCBE transmit in the same physical channel CBPCH.

In order to determine the format and the content of the local cell broadcast messages in phase b), the LCBE can receive at least one of the following pieces of information: the message to be transmitted via the physical transport channel CBPCH; the desired coverage radius for the LCBE; the use mode of the physical transport channel CBPCH, that is, if said channel is shared with the base station, in which case the LCBE will enable a multiplexing mechanism between the base station and the LCBE, or it is not shared; and security information.

In the same way as for the system object of the invention, the method can be applied either to a GSM system, to a UMTS system, or any other mobile phone system. If a GSM system is applied in phase a), where the LCBE recognises the physical transport configuration of the cell broadcast messages, the LCBE can recognise the frequency to which said messages have to be transmitted, the temporal slot and the multiframe plan in which it has to transmit, and the Time in Advance (TA) value, to perform a transmission adjustment.

If the method is applied to a UMTS system, the mobile network can periodically send cell broadcast messages, by means of the base station, to keep the associated radio resource always open and present so that it can be used by the LCBE, in a similar way to how it is used in the GSM system.

The system and method object of the invention has been described specifically applying it to a radio cell of a mobile telephone system, being able to extend it and apply it to the rest of the cells in said telephone system.

Likewise, the system and method object of the invention has been described applying it to the physical channel used in the cell system for cell broadcast (for example, channel CBCH of GSM), being able to extend it and apply it to the other physical channels existing in said cellular system.

BRIEF DESCRIPTION OF THE DRAWINGS

For a better understanding of the invention, the following is a brief description of an embodiment of the invention which is presented as a non-limiting example thereof. For this purpose, reference is made to the attached drawings, in which.

DESCRIPTION OF A PREFERRED EMBODIMENT OF THE INVENTION

Figure 1:
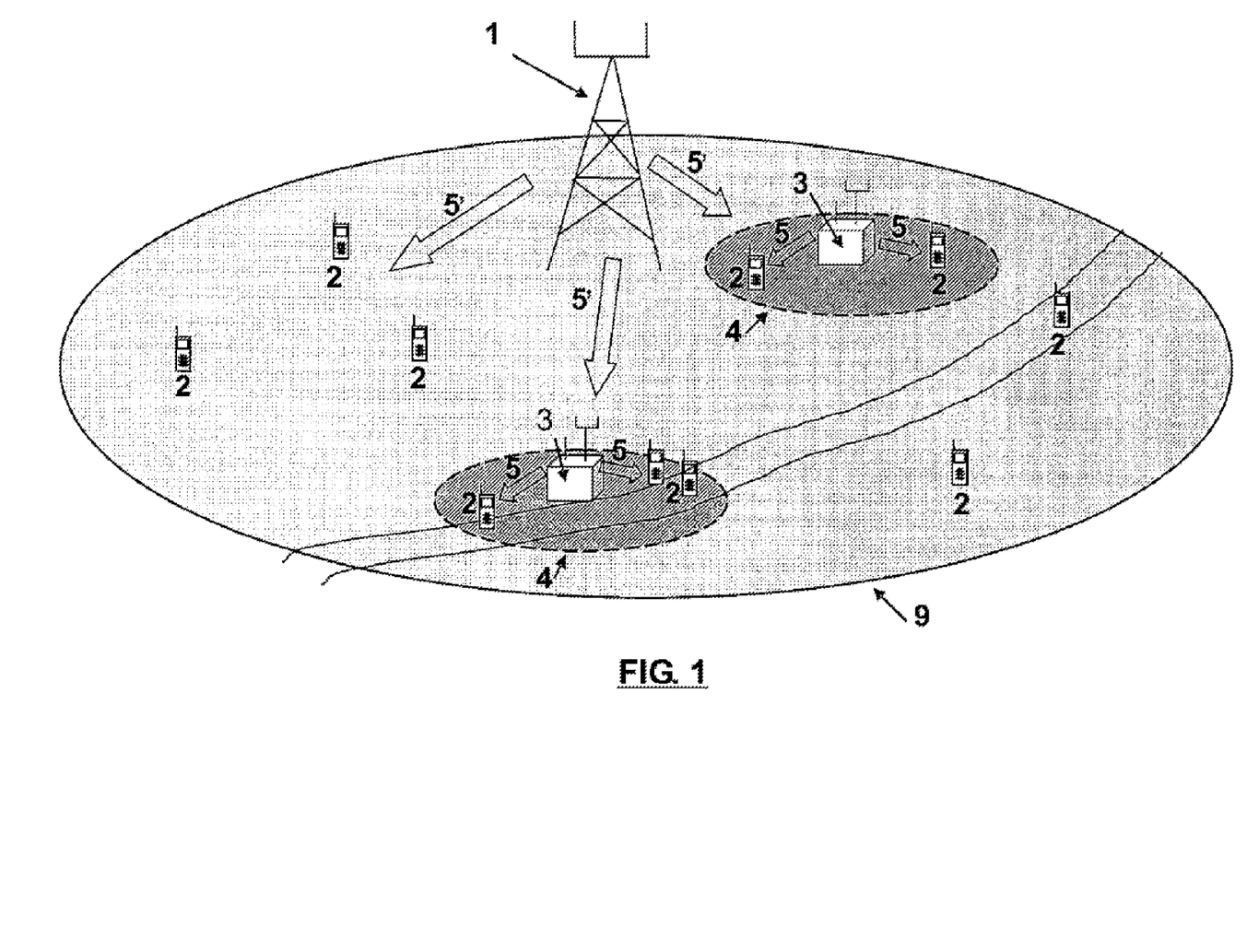
FIG. 1 shows a cell from a mobile telephone system; wherein, the base station and a plurality of local cell broadcast equipments LCBE are represented, showing the coverage area of each one of them.

The information broadcast system for reduced local environments, inferior to a radio cell, and applied to a cell of a mobile telephone system, comprises for said cell 9, as it can be seen in FIG. 1, a base station 1 providing service to cell 9, and a plurality of mobile terminals 2, which are the system users. In addition, it comprises for said cell 9 a plurality of local cell broadcast equipments LCBE 3, that transmits some local cell broadcast messages 5 to the mobile terminals 2 located in their coverage area 4 using a physical transport channel for the cell broadcast CBPCH. The LCBE 3 equipments can be located, for example, in petrol stations, next to roads as shown in FIG. 1, shopping centres, hypermarkets, etc. The local information provided by LCBE to the mobiles located within its coverage area 4 can be very varied, from information on promotions and offers to traffic or weather information services. In FIG. 1, reference 5' is used to represent cell broadcast messages that the base station 1 transmits to the mobile terminals 2 located within its cell 9; whereas reference 5 is used for the local cell broadcast messages transmitted by LCBE 3 to the mobile terminals located within its coverage area 4.

Figure 2:
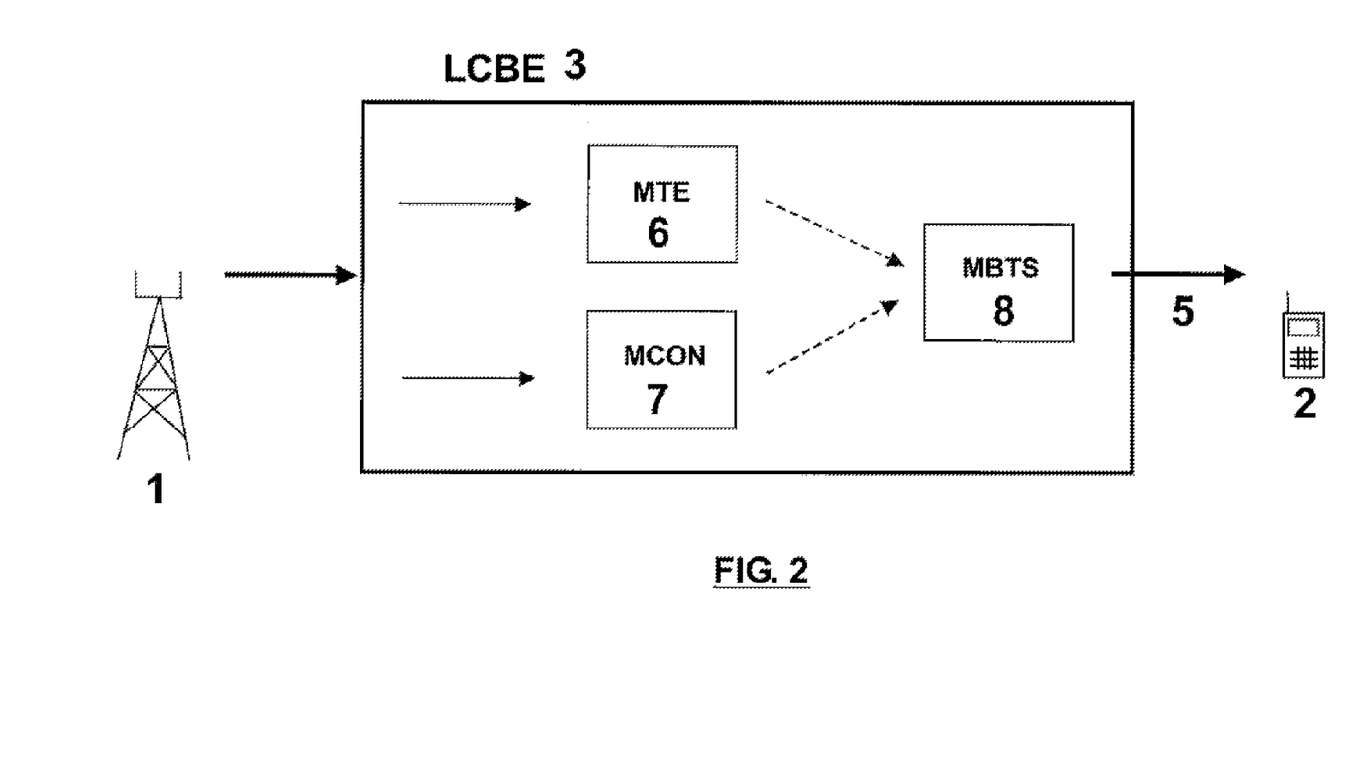
FIG. 2 shows a basic scheme of the system object of the invention; wherein, the local cell broadcast equipment components LCBE are represented.

Each LCBE 3 comprises the following components, as presented in FIG. 2:

Reception means MTE 6: its function is to synchronize with the base station that covers cell 9 and listen to the information provided by said station, as any mobile terminal would do. Part of the information provided by the network through the base station consists precisely in the physical transport configuration of the cell broadcast messages 5', with the purpose that the mobile terminals can receive them.

Configuration and content means MCON 7: they are in charge of gathering, interpreting and processing the information that arrives through another channel or service and that is destined to configure and give content to the broadcasted information by the LCBE 3. The access channel of the MCON 7 could be a local interface (for example, from a localized server next to the equipment) or a remote interface (for example, from the base station itself which could send information to the equipment as SMS or GPRS/UMTS data since it can comprise a built-in telephone system subscription card). The role of this MCON 7, together with the external service that the entry provides, could be compared to the role of the CBE and CBC functional nodes in the standard architecture of cell broadcasting described in the 3GPP standards for GSM and UMTS, since these nodes are the ones that determine the format and content of the cell broadcast messages 5'. It is also possible that the MCON 7 does not use any external access and it is capable of composing local cell broadcast messages 5 in an autonomous way.

Transmission means MBTS 8: it would take charge of transmitting local information in the radio interface, from the data provided by MTE 6 and MCON 7, in the physical transport channel CBPCH so that the mobile terminals 2 located within the coverage area 4 of the LCBE 3 do not distinguish if said information come from the base station 1 providing service to that cell 9 or from the LCBE 3. Likewise, the mobile terminals 2 should be prepared to receive local cell broadcast messages 5 and to understand their content. As regards the first task, reception, it is based on the standard mechanisms of the mobile network, and therefore, it does not require any modification of the mobile terminal 2. The second task, the interpretation of content off messages 5, can require an additional step to the standard mechanisms and in this case it would require of simple software in terminal 2. This software would interpret the messages 5 according to the way in which MCON 7 of the LCBE 3 equipment configured and formatted them, if this way is specific and different from the standard, or it would decode the messages if these were encrypted, etc.

Figure 3:
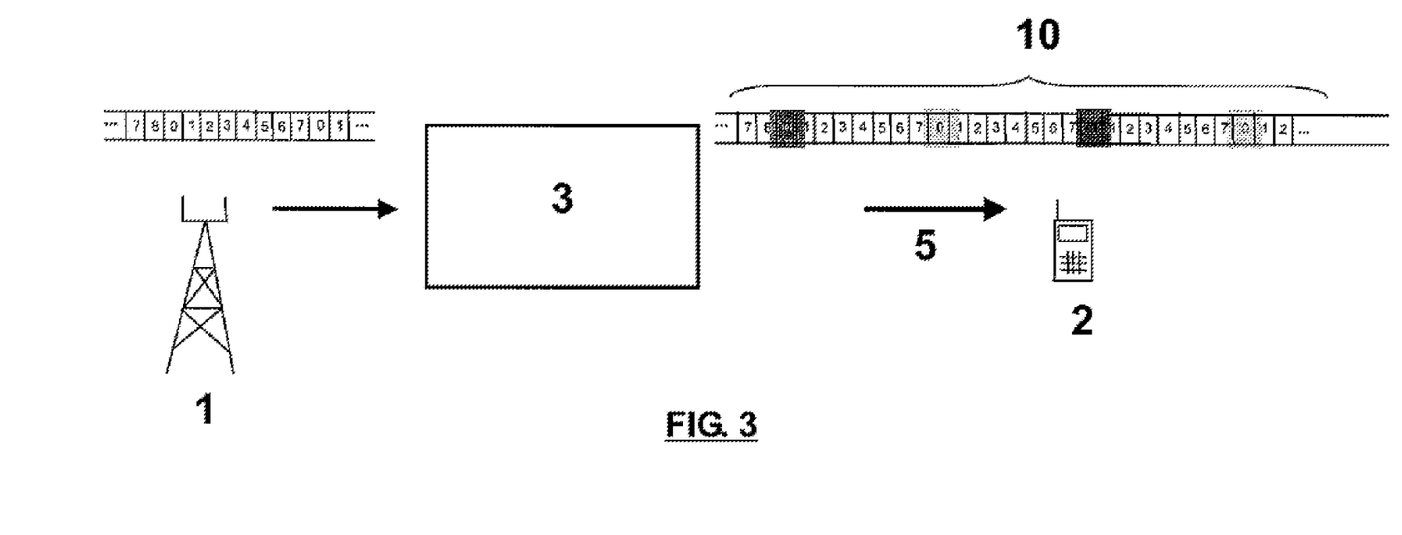
FIG. 3 shows a basic scheme of the system object of the invention applied to a GSM system; wherein, the temporal slots GSM are represented in the radio interface as an illustration.

A preferred implementation for the GSM system is proposed, according to FIG. 3, based on the following pre-requirements:

The base station 1 that serves cell 9, where the LCBE 3 is located, has the active Cell Broadcast Service (CBS), so that it sends in its BCCH (Broadcast Control Channel, channel that communicates basic information and the system parameters from the base station 1 to the mobile 2), particularly in its System Information Type 4, information relative to the presence of the CBCH (Cell Broadcast Channel) in the multiframe GMS 10 and how the mobile terminal 2 can listen to it. Implementations of the kind in which the base 1 did not have the active service CBS could also be possible, but the system would not be so clean and it could cause interference in the normal service of the mobile network (since the transmission of the LCBE 3 might interfere with the SDCCH signalling, Stand-Alone Dedicated Control Channel, from the base station to the mobile terminals).

There is no collision between the CBCH signal sent by the base station 1 and the CBCH signal locally sent by the LCBE 3. This can be achieved in two ways:

The base station 1 does not send any content in the CBCH channel. That is to say, this channel would always be empty and free to be used by the LCBE 3.

The base station 1 sends content in the CBCH channel in specific moments that are known by the LCBE 3 and the mobiles 2. That is to say, there is a multiplexing mechanism that determines when it is the time for transmitting from the base station and when there is free time for the LCBE 3 transmission. There are many technical possibilities for implementing this mechanism, for example, it could be synchronous (establishing fixed temporal patterns) or asynchronous (the base station 1 could indicate when it leaves the channel free and when it requires it again).

As in the last point, embodiments of the patent in which the base station 1 does not comply with these requirements could also be possible, but again the system would not be so clean, since there would be a collision between the CBCH signals from two different sources, and the mobile terminal 2 could only read and decode the stronger CBCH signal each time (for example, by being right next to the LCBE 3).

The mobile terminals 2 are configured, in their menus and their additional software, if they had one, to listen and understand the cell broadcast messages either at the base station 1 or from the LCBE 3 (for example, there are various codes or message numbers to choose from). Except for what is done in the additional software, this configuration is completely standard and, in fact, necessary for the habitual service of cell broadcast of mobile networks GSM.

The following are the details of the preferred implementation for GSM:

By means of a channel or external service to the LCBE 3 (for example, SMS or connection to the service management application via radio interface, example, GPRS) and IP, or by means of default data, the MCON 7 receives information to configure the default service and for the current operation situation:

The data to be broadcasted via channel CBCH, that is, the message 5 with the adequate format so that they can be transmitted by radio (88 octets, 6 header ones, and 82 content ones). This content could be something as simple as the LCBE 3 identity (for very precise localization services) or another more complex type of information but also associated to that particular localization (for example, associated to traffic).

Desired radio coverage for the LCBE 3.

Use mode of the LCBE 3 channel (in the case there exists the aforementioned multiplexing between the base station 1 and the LCBE 3): two basic modes, if cell information is broadcasted or not.

Security information (for example, if it is desired to apply the service in a restricted way, the messages 5 can be encrypted so that only some operator users can read them.)

The MTE 6 is tuned into the f0 frequency of the cell 9 carrier in which the LCBE 3 is located. Moreover, it is also tuned to the multiframe 10 temporal structure of the base station 1 (this implies an adjustment according to TA, Time in Advance). This process is analogous to the one performed by a mobile terminal.

The MTE 6 gathers cell information broadcasted in the BCCH channel of the carrier f0. The information relative to cell broadcasting is contained in the message "System Information Type 4", which indicates the location of the present CBCH channel, that is to say, in which frequency (in the carrier f0 itself or in a jump group), and in which temporal slot of the frame and multiframe GSM 10. This part also corresponds to the standard mechanisms of the GSM system between the network and the mobile terminals.

With all these data, the MTE 6 informs the MBTS 8 of:
the frequency at which it has to transmit (f0 or jump group);
the temporal slot in which it has to transmit to;
the multiframe plan 10 (the CBCH one) in which it has to do it;
the TA, Time in Advance, value, to be compensated.

The MBTS 8 from the previous data provided by the MTE 6 and from the configuration data provided by the MCON 7:

Calculates the power at which it has to transmit, according to the characteristics of the LCBE implementation, the coverage radius indicated by the MCON 7, and the power of the carrier f0 of the base station 1 that covers cell 9 at the point wherein the LCBE 3 is located.

Transmits in the radio interface the cell broadcast information indicated by MCON 7 in an identical way as a base station 1 does. For this purpose, it uses the frequency and time data provided by the MTE 6 as well as the indications for the multiplexing process with base station 1, and security information from the MCON 7. It is important to point out that the MBTS 8 uses standard filters and power masks of the GSM system and that it does not perform any transmission outside the corresponding temporal slot of the CBCH channel, so it does not either interfere in any way (except for the controlled interference for the CBCH channel) with the signal of the base station 1, or with the normal functioning of the mobile network. Likewise, within the LCBE 3 itself, the MTE 6 activities (reception) and the MBTS 8 ones (transmission) can be perfectly combined with simple mechanisms so that one is not affected by the other.

The mobile terminals 2 receive the CBCH signal from the LCBE 3, and since it is channelled in the radio interface in the same way as if it came from the base station 1, they receive it and interpret it correctly, extracting the local cell broadcast messages 5.

In the case that the content of the messages 5 had been formatted in a non-standard way in the MCON 6 module, or in spite of being formatted in a similar way it is desired to interpret the content in a special way, a simple application in the terminal would handle this task. It would also take charge of the decoding, if it was necessary. In addition, the software of terminal 2 could be prepared to distinguish the multiplexing of the CBCH channel between the base station 1 and the LCBE 3, so it could determine which the source of the messages in each case is and treat them differently.

Therefore, in the case that the invention is implemented for GSM, there is a controlled interference, since the LCBE (3) only transmits in the physical channel (frequency, temporal slot, and part of the multiframe) corresponding to the cell broadcasting.

The preferred implementation for the UMTS system would hardly differ from the previously described one for GSM, and it could be obtained from it, taking into account the UTRAN of UMTS radio interface peculiarities for the cell broadcasting support, with the following guidelines:

In UMTS there is not a CBCH logical channel with static physical structure and fixed capacity (frequency, temporal slot, and multiframe pattern), but a radio resource of variable capacity formed by a logical channel CTCH mapped onto a FACH transport one, in turn mapped onto a physical one S-SCCPCH. These channels are established in the mobile network when the first cell broadcast message arrives, and then they are communicated to the mobile terminals of cell 9, by means of a System Information message of the BCCH channel (similarly to GSM.)

Therefore, the UMTS mechanism also allows the MTE 6 of the LCBE 3 to know how the cell broadcast information is transmitted in such a way that the MBTS 8 can use it later to simulate a transmission from the base station 1. This means that all the preferred implementation described for GSM would also be applicable for UMTS, with the only significant difference that it would require a greater mobile network configuration to keep the associated radio resource always open and present, so that it can be used by the LCBE 3, for example, periodically sending cell broadcast messages 5'. On the other hand, the extra mobile network configuration required in UMTS can be combined with the multiplexing mechanism between the base station 1 and the LCBE 3; already herein described in the GSM case. In any case, the final result is that the LCBE transmission entails a controlled interference in the cellular system, the same as for GSM.

The system and method object of the invention have been described for a concrete application to a radio cell of a mobile telephone system, but it can also be extended and applied to the rest of the cells in said telephony system.

Likewise, the system and object of the invention have been described for an application to the physical channel used in the cellular system for cell broadcasting (for example, the CBCH channel of GSM) but it can be extended and applied to other physical channels in said cellular system.

The invention claimed is:

1. A cell broadcast system for reduced local environments, inferior to a radio cell, and applied to a cell of a mobile telephone system, the cell broadcast system comprising:
for said cell:
a base station providing service to the cell,
a plurality of mobile terminals, users of the system located within the cell;
at least one, Local Cell Broadcast Equipment (LCBE) that transmits local cell broadcast messages to the mobile terminals located in their coverage area, using a physical transport channel Cell Broadcast Physical Channel (CBPCH) for cell broadcasting, this channel being a physical channel of the cellular system, and
wherein the at least one, LCBE equipment comprises:
Terminal Module (MTE) reception means in charge of synchronizing with the base station providing service to the radio cell; wherein the at least one LCBE is located, and in charge of capturing the information provided by said base station, recognizing the physical transport configuration of the cell broadcast messages in said cell;
Mobile Configuration and Control (MCON) configuration and content means in charge of determining the format and content of the cell broadcast messages; and
Mobile Base Transceiver Station (MBTS) transmission means in charge of transmitting the radio interface of the local cell broadcast messages, from the data provided by the MTE and MCON; and
wherein the mobile terminals located in the coverage area of the at least one LCBE, receive and interpret the signal broadcasted by said at least one LCBE, through the physical transport channel CBPCH and extract the local cell broadcast messages.

2. Thus system according to claim 1, wherein in order to determine the format and content of the local cell broadcast messages the MCON receives some input data by means of an external service to the LCBE, through an access channel.

3. Thus system according to claim 2, wherein the access channel of the MCON is a local interface.

4. Thus system according to claim 2, wherein the access channel of the MCON is a remote interface.

5. Thus system according to claim 4, wherein the LCBE has a telephone system subscription card through which the MCON receives input data.

6. Thus system according to claim 1, wherein in order to determine the format and content of the local cell broadcast messages the MCON receives some input data by an internal service of the LCBE, and thus LCBE composes said messages in an autonomous way.

7. Thus system according to claim 1, wherein the mobile terminals have an application with at least one of the following functions:
to interpret the local cell broadcast messages sent by the LCBE through the physical transport channel CBPCH, in the event that the format thereof is different from the standard format for cell broadcast messages or if it is desired to interpret the content in a special way;
to decode the message, in the event that the LCBE transmits it encrypted; and
to distinguish the multiplexing of the physical transport channel CBPCH, in the event that both, the base station and the LCBE transmit cell broadcast messages in the same physical channel CBPCH.

8. Thus system according to claim 1, wherein in order to determine the format and content of the local cell broadcast messages the MCON receives at least one of the following pieces of information:
the message to be transmitted via the physical transport channel CBPCH;
the desired coverage radius for the LCBE;
the use mode of the physical channel, that is, if said channel is shared with the base station, in which case the LCBE will enable a multiplexing mechanism between the base station and the LCBE, or it is not shared; and
security information.

9. Thus system according to claim 1, wherein the system comprises a Global System for Mobile Communications (GSM) system.

10. Thus system according to claim 9, wherein the MTE informs the MBTS the frequency at which it has to transmit the local cell broadcast messages, the temporal slot, the multiframe plan in which the transmission has to be performed, and the TA (Time in Advance) value to adjust the transmission.

11. Thus system according to claim 1, wherein the system comprises a Universal Mobile Telecommunications System (UMTS) system.

12. Thus system according to claim 11, wherein the mobile network periodically sends cell broadcast messages, via the base station, to always keep the associated radio resource open and present so that it can be used by the LCBE.

13. A cell information broadcast method for reduced local environments, inferior to a radio cell, and applied to a cell of a mobile telephone system, comprising for said cell a base station providing service to the cell, and a plurality of mobile terminals, users of the method located within the cell; and wherein it uses for said cell at least one Local Cell Broadcast Equipment (LCBE) which transmits the local cell broadcast messages to the mobile terminals located within its coverage area, using a physical transport channel for cell broadcast Cell Broadcast Physical Channel (CBPCH), being said physical channel part of the cellular system, the method comprising the following steps:
a—the at least one LCBE synchronizes with the base station providing service to the radio cell], where it is located, and captures the information provided by said base station, recognizing the physical transport configuration of the cell broadcast messages in said cell;
b—the at least one LCBE determines the format and content of the local cell broadcast messages;
c—the at least one LCBE transmits in the radio interface the local cell broadcast messages; and
d—the mobile terminals, located in the coverage area of the at least one LCBE, receive and interpret the signal broadcasted by said at least one LCBE through the physical transport channel CBPCH and extract the local cell broadcast messages.

14. The method according to claim 13, wherein in order to determine the format and content of the local cell broadcast messages in phase b) the LCBE receives some input data via an external service to the LCBE, through an access channel.

15. The method according to claim 14, wherein the access channel of the LCBE is a local interface.

16. The method according to claim 14, wherein the access channel of the LCBE is a remote interface.

17. The method according to claim 16, wherein the LCBE receives the input data by means of a built-in telephone system subscription card.

18. The method according to claim 13, wherein in order to determine the format and content of the local cell broadcast messages in phase b) the LCBE receives some input data via an internal service to the LCBE, thus LCBE composes said messages in an autonomous way.

19. The method according to claim 13, wherein the mobile terminals use an internal application for at least one of the following processes:

to interpret the local cell broadcast messages sent by the LCBE through the physical transport channel CBPCH, if their format is different to the standard format for said messages or it is desired to interpret the content in a special way;

to decode the message, if the LCBE transmits it encrypted; and     to distinguish the multiplexing of the physical transport channel CBPCH, in the event that both the base station and the LCBE transmit in the same physical channel CBPCH.

20. The method according to claim 13, wherein in order to determine the format and content of the local cell broadcast messages in phase b) the LCBE receives at least one of the following pieces of information:

the message to be transmitted via the physical transport channel CBPCH;

the desired coverage radius for the LCBE;

the use mode of the physical channel CBPCH, that is, if said channel is shared with the base station, in which case the LCBE will enable a multiplexing mechanism between the base station and the LCBE, or it is not shared; and     security information.

21. The method according to claim 13, wherein the system is a Global System for Mobile Communications (GSM system.

22. The method according to claim 21, wherein in phase a), where the LCBE recognizes the physical transport configuration of the local cell broadcast messages, the LCBE recognizes the frequency at which it has to transmit the local cell broadcast messages, the temporal slot, the multiframe plan in which the transmission has to be performed, and the TA (Time in Advance) value to adjust the transmission.

23. The method according to claim 13 wherein the system is a Universal Mobile Telecommunications System (UMTS) system.

24. The method according to claim 23, wherein the mobile network periodically sends cell broadcast messages through the base station, to always keep the associated radio resource open and present so that it can be used by the LCBE.

* * * * *